United States Patent [19]

Davison

[11] Patent Number: 4,589,344
[45] Date of Patent: May 20, 1986

[54] MONORAIL CONVEYANCE SYSTEM FOR WIND OR WATER POWERED GENERATOR APPARATUS

[76] Inventor: Fred E. Davison, Box 37, R.R. #1, Highwood, Mont. 59450

[21] Appl. No.: 452,957

[22] Filed: Dec. 27, 1982

[51] Int. Cl.⁴ ............................................. B60K 9/00
[52] U.S. Cl. ...................... 104/24; 104/118; 104/247; 105/141; 290/44; 290/55
[58] Field of Search ............... 290/1 R, 1 C, 1 D, 290/4 D, 42, 43, 44, 53, 54, 55; 416/132 B; 417/330, 333, 334; 104/24, 89, 93, 94, 106–109, 118, 119, 245–247; 105/141, 144, 148, 150, 155, 156

[56] References Cited

U.S. PATENT DOCUMENTS

| | | | |
|---|---|---|---|
| 630,250 | 8/1899 | Mary | 104/108 X |
| 1,582,361 | 4/1926 | Welsch | 416/132 R |
| 1,728,576 | 9/1929 | Schem | 104/119 |
| 1,801,141 | 4/1931 | Connors | 104/119 X |
| 2,807,058 | 9/1957 | Morgan | 105/155 X |
| 3,220,629 | 11/1965 | Anderson | 105/156 X |
| 3,518,945 | 7/1970 | Raney et al. | 104/93 X |
| 3,730,643 | 5/1973 | Davison | 416/8 |
| 3,902,432 | 9/1975 | Shortridge et al. | 104/93 X |
| 3,916,797 | 11/1975 | Block et al. | 104/135 X |
| 3,950,952 | 4/1976 | Krings | 104/118 X |
| 4,053,253 | 10/1977 | Coffer | 415/5 |
| 4,144,817 | 3/1979 | Morita | 104/93 X |
| 4,163,905 | 8/1979 | Davison | 290/54 |
| 4,303,834 | 12/1981 | Li | 290/55 |

*Primary Examiner*—Randolph A. Reese
*Attorney, Agent, or Firm*—Workman, Nydegger & Jensen

[57] ABSTRACT

A novel wind or water powered generator apparatus is provided for generating substantial quantities of electricity. The apparatus includes a plurality of sail-driven cars connected to form a continuous chain and suspended from a monorail loop. The car suspension system has two horizontal guide wheels and one vertical carrier wheel. Substantially the entire weight of each car is carried by its vertical wheel, which is located near the car's center of gravity. Further, all three suspension wheels are located inside the monorail, thereby rendering car derailment virtually impossible.

Two sails are attached to each car, one being directed upwardly and the other being directed downwardly. The surface areas of the two sails are such that the average, total current force on each sail is approximately the same. Additionally, the novel sails are free to rotate 360 degrees about their support poles, but they are biased to a preferred orientation. Thus, as the current and biasing forces interact, the cars are propelled along the monorail. Importantly, in the event that destructive strength currents arise, the sails rapidly align themselves with the current, thereby preventing sail destruction.

One or more elongated augers are positioned adjacent the monorail loop. Auger drive rollers are attached to each car such that the adjacently moving cars rotate the auger. A generator is connected to the augers so as to be driven thereby.

10 Claims, 11 Drawing Figures

MONORAIL CONVEYANCE SYSTEM FOR WIND OR WATER POWERED GENERATOR APPARATUS

BACKGROUND

1. Field of the Invention

This invention relates to apparatus and methods for generating electrical power and, more particularly, to novel apparatus and methods for generating electrical power from natural air or water currents.

2. The Prior Art

As a result of the rapid growth of technology in recent years, demand for electrical energy is enormous. In an effort to meet this demand, hundreds of electrical power plants have been built during the last decade. Most of these power plants have been of the more traditional type, e.g. hydroelectric generators and generators driven by the combustion of mineral resources. However, with the demand for electrical power continuing to grow, there is an increasing concern as to feasibility and desirability of using traditional electrical energy sources to supply future energy needs. Many of the present power plants, for example, produce considerable quantities of air and water pollution. The construction of additional dams and hydroelectric generators would have a significant impact on the surrounding environment. Additionally, as natural resources are consumed to produce electrical energy, there is great cause for concern about the possibility of severe resource shortages in future years. Also, the cost of operating traditional electrical power plants that generate electricity by the combustion of natural resources is increasing rapidly. As a result of these concerns, a great deal of attention has been directed toward the development of environmentally cleaner, more economical sources of electrical energy.

One possibility having great potential is the harnessing of the kinetic energy of natural air or water currents. The earth's atmosphere, oceans, and rivers are in constant motion, and if these air and fluid currents could be efficiently used to generate electricity, they would constitute a virtually inexhaustible source of electrical energy.

Unfortunately, major problems have been encountered in developing a structurally sound device which has the surface area needed to generate large quantities of electricity from air or water currents. Windmills and water wheels, for example, are suitable for small generating tasks, but have not proven useful in the generation of large quantities of electricity.

Another problem encountered when attempting to generate electricity from air or water currents is the fact that although there may be a generally prevailing direction of travel, at times the current may approach the generator from virtually any direction. Accordingly, it must either be accepted that the generator will occasionally be idle, or provision must be made to cause the generator device to be properly aligned with the oncoming current. However, as the generator's size is increased, so as to increase its generating capacity, movement of the generator device becomes much more difficult. Thus, those skilled in the art have faced a major challenge in attempting to develop an efficient wind or water powered apparatus having sufficient surface area to generate significant quantities of electricity and which is also capable of being quickly adjusted in response to changes in current direction.

Yet another problem inherent in the use of air or water currents to drive a generator is the fact that the strength of these currents may vary widely from one season to the next, or even from one day to the next. It has proven a very difficult task to provide an apparatus capable of structurally sustaining periods of strong current flow, and yet capable of generating electricity during periods of weak current flow.

A typical approach in the construction of wind or water powered generators has been to interconnect a plurality of individual sail structures so as to form a closed loop, and cause them to travel in an oval-shaped path. As the wind or water current propels the sail structures around the oval-shaped path, the sail structures drive one or more electric generators.

However, devices which incorporate this general concept vary widely in structure. For example, in one such device, the several sail structures are attached to a looped cable which is suspended by a pair of spaced-apart wheels. As the current causes the sail structures to move around the loop, the cable travels around the wheels, thereby driving a single electric generator which is connected to one of the wheels. Other devices accomplish the same result by using a chain and a pair of sprocket wheels in place of the cable and wheels described above. Alternatively, an oval track is sometimes used to support and guide the individual sail structures, and some devices have a separate small generator mounted on each sail structure.

Various methods for aligning loop-type generators with the direction of the air or water current have also been employed. One approach has been to place the device in a canyon or channel, where the air or water current moves substantially in only one direction. This approach is clearly of limited utility.

A more useful approach for aligning the generator devices with an air or water current has been to manually or mechanically vary the orientation of the several said structures as the current direction changes. Such a method has also been used to make minor adjustments in the orientation of the sails of a device placed in a canyon or channel.

When the orientation of the sail structures is varied mechanically, each sail structure typically has a servo-motor attached thereto. A separate apparatus detects the direction of the oncoming air or water current, and the servo-motors are programmed to position the sail structures accordingly. Some devices further have the ability to detect the velocity of the oncoming current. In these devices, the servo-motors are further programmed to orient the sail structures so as to present a minimum resistance in the event that the oncoming current becomes too strong and would otherwise cause damage to the sail structures.

Unfortunately, the servo-motors are generally unable to change the sail orientation very rapidly. Hence, the servo-motors may be incapable of adequately aligning the sails for minimum resistance in the event that a destructive current force arises. In any event, the servo-motors cannot respond rapidly enough to protect the sail structures from short, strong blasts of current force. Further, the complexity and sensitivity of the servo-motors and the accompanying current detection devices contribute to the possibility of frequent breakdowns and to the necessity for constant supervision and maintenance.

Although these loop-type generator devices are definitely an improvement in the art, they have proven inadequate in several respects. First, the cable or chain to which the individual sail structures are secured occasionally become detached from the suspending wheel or sprocket. When this happens, the sail structures typically collide with surrounding objects and are severely damaged. Even if the device includes a track to guide the individual sail structures, the sail structures sometimes derail and become damaged. Since these sail structures are generally quite large, their replacement is usually both time consuming and costly.

In addition to these structural problems, prior art devices suffer from some notable inefficiencies. For example, the use of a cable or chain to interconnect the separate sail structures necessitates the use of very large suspending wheels or sprockets, together with their associated anchoring structure. This adds significantly to the cost of construction and also materially increases the weight which must be moved before the electric generator begins to function. Thus, the generating efficiency of the device is decreased substantially. Likewise, mounting separate generators and servo-motors on each sail structure adds to the weight of the device and thereby decreases its total generating efficiency.

Accordingly, it would be an improvement in the art to provide a strong, stable electrical generating device which can efficiently produce substantial quantities of electricity from natural air or water currents. Additionally, it would be an improvement in the art to provide a loop-type electrical generating device wherein the several sail structures are quickly and automatically aligned with the air or water current for maximum generating efficiency, yet are rapidly oriented for minimum resistance when destructively forceful currents arise. It would also be an improvement in the art to provide a large capacity wind or water powered electrical generating device which permits the use of a stationary, central electric generator and in which the means for driving the electric generator is light and inexpensive. It would also be an improvement in the art to provide a wind or water powered electric generator having numerous individual sail structures yet in which there is a minimal possibility of said derailment and destruction. Such a device is disclosed and claimed herein.

BRIEF SUMMARY AND OBJECTS OF THE INVENTION

The present invention is directed to a wind or water powered device for generating large quantities of electricity.

The novel electrical generating device of the present invention comprises a plurality of sail-driven cars which move along a monorail, being guided by the use of suspension wheels. In a preferred embodiment, three such wheels are provided, with two of the wheels having a substantially horizontal orientation and the third wheel having a substantially vertical orientation. The vertical suspension wheel carries nearly the entire weight of the car, and the two horizontal wheels provide stability and prevent car derailment. Additionally, the clearance between the cars and the monorail is minimal, such that if the suspension wheels fail, the car will come to rest on the monorail, rather than being derailed.

Each car preferably has two separate sail structures. One of these sail structures is directed upwardly, and the other, downwardly, the two sail structures being on opposite sides of the car's suspension wheels such that the location of the car's center of gravity approximately coincides with the position of its vertical suspension wheel on the monorail.

Additionally, the dimensions of the two sail structures may be advantageously determined so as to cause each sail to experience approximately the same average current force. Thus, if the average current velocity at the altitude of the upward sail is greater than at the altitude of the downward sail, the upward sail's surface area should be correspondingly smaller than that of the downward sail.

In a preferred embodiment, each sail structure is mounted on a vertical pole, with the pole extending through the sail structure adjacent to one vertical edge thereof, such that the sail is almost entirely on one side of the pole. The sails are free to rotate 360 degrees about the pole, but they are biased to a preferred orientation, which is parallel to the direction of travel.

When a current force acts on the sail, the biased sails resist the current flow, thereby allowing the current to propel the car along the monorail. If the current force becomes destructively strong, the sail structure will quickly align itself with the current for minimum resistance. Then, when the current force decreases, the sail structure will return to an efficient operating position.

In a preferred embodiment, the cars pass adjacent to an auger mounted parallel to the monorail track as they are propelled around the monorail. Auger drive rollers are advantageously attached to each car such that the auger is rotated by the passing cars. The rotating auger is then used to drive an electric generator.

It is, therefore, a primary object of the present invention to provide a strong, stable wind or water powered device which can efficiently generate significant quantities of electricity from natural air or water currents.

It is another object of the present invention to provide an electric generating system having numerous individual sail structures wherein the several sail structures quickly and automatically align themselves with normal air or water currents for maximum generating efficiency, and also rapidly orient themselves for minimum resistance when destructively forceful currents arise.

It is another object of the present invention to provide a wind or water powered electric generating device having numerous individual sail structures and in which the likelihood of sail derailment and destruction is minimal.

Additionally, it is an object of the present invention to provide a sail-car track and suspension assembly which can be used in a wind or water powered electrical generating system, and which minimizes the possibility of sail-car derailment.

It is also an object of the present invention to provide a large capacity wind or water powered electric generating device which uses a stationary, central electric generator having a light, inexpensive driving means.

These and other objects and features of the present invention will become more fully apparent from the following description and appended claims, taken in conjunction with the accompanying drawings.

DETAILED DESCRIPTION OF THE PREFERRED EMBODIMENTS

The presently preferred embodiments of the invention will be best understood by reference to the drawings, wherein like parts are designated with like numerals throughout.

Figure 1:
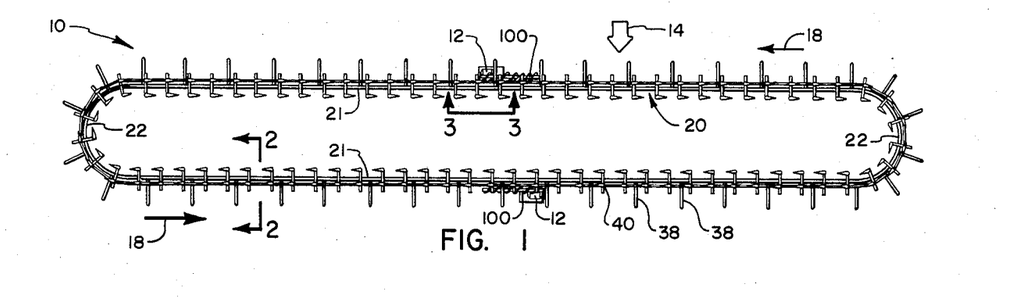
FIG. 1 is a top plan view of one presently preferred embodiment of the wind powered generating apparatus of the present invention showing a chain of sail-car assemblies mounted for conveyance around a monorail loop.

One presently preferred embodiment of the wind or water powered generator apparatus of the present invention, generally designated 10, is illustrated in FIG. 1. As shown in FIG. 1, generator apparatus 10 comprises monorail 20, sail-cars 40, augers 100, and electric generators 12.

Monorail 20 forms an essentially ovate loop, having two substantially linear, parallel side track segments 21 which are joined by two substantially semi-circular end track segments 22. A plurality of sail-cars 40 are suspended from monorail 20 so as to be constrained to travel around monorail 20. Sail-cars 40 are also coupled together, thereby forming a conveyance system comprised of a continuous sail-car chain. As a current (illustrated by arrow 14), passes through the area of generator apparatus 10, sail-cars 40 will be caused to travel along monorail 20 in the direction indicated by arrows 18.

One or more augers 100 are positioned adjacent and substantially parallel to monorail 20 and are turned by the passing sail-cars. Electric generators 12 are coupled to the augers such that the rotation of the augers drives the generators, thereby generating electricity.

Figure 2:
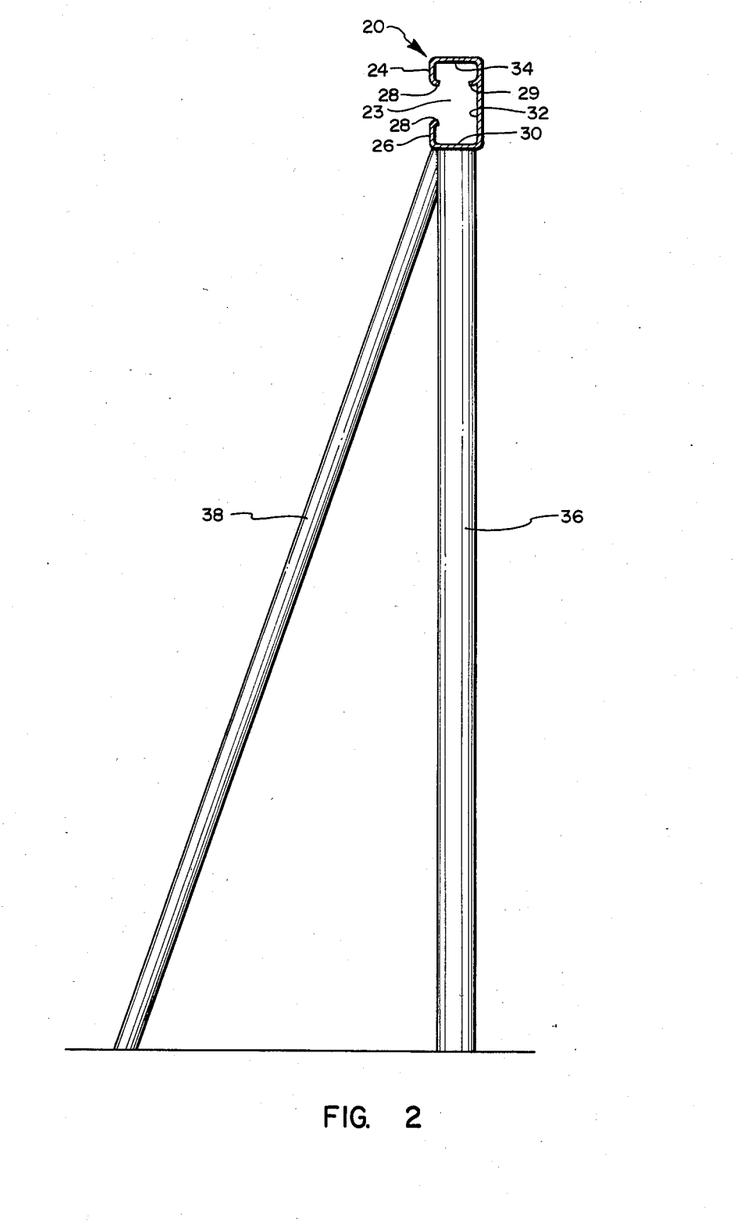
FIG. 2 is an end cross-section view of the monorail track of the present invention taken along the line 2—2 of FIG. 1, the sail-car assemblies being omitted for purposes of illustration.

The preferred construction of monorail 20 is best shown by FIG. 2, although it will be appreciated that various changes may be made without departing from the inventive concepts described herein. As illustrated in FIG. 2, the monorail is hollow and has a generally rectangular cross-section, with the longer sides of the rectangle being substantially vertical. The vertical sidewall of monorail 20 which is toward the outside of the monorail loop (see FIG. 1), is advantageously provided with a continuous channel 23 opening into the interior of the monorail although it is to be understood that channel 23 could alternatively be located on the interior of sidewall 32 of the monorail. Importantly, channel 23 is sufficiently narrow that an upper partial vertical sidewall 24 and a lower partial vertical sidewall 26 lie directly above and below the channel, respectively. Also, the free edges 28 of partial vertical sidewalls 24 and 26 are advantageously turned slightly inward toward the interior of monorail 20. As best seen in FIG. 2, it is also advantageous to provide an interior free edge or lip 29 opposite upper free edge 28. As will be more fully explained below, sidewalls 24 and 26 cooperate with the suspension system of the sail-car.

Monorail 20 is supported by support posts 36 and support braces 38. As depicted in FIG. 2, support posts 36 are vertically oriented and are connected to the bottom wall 30 of monorail 20. Support braces 38 are attached to the upper end of each support post 36 so as to form an acute angle with respect to the support post, and extend outwardly from the monorail loop (see FIG. 1), thereby affording lateral stability to the support posts. Alternatively, the support posts could be oriented toward the interior of the loop, and guy wires (not shown) could be attached to opposite sides of the loop to maintain the monorail under tension. When this approach is taken, the orientation of the sail-cars on the monorail should be reversed so that they will not be obstructed by the guy wires or support posts.

Figure 3:
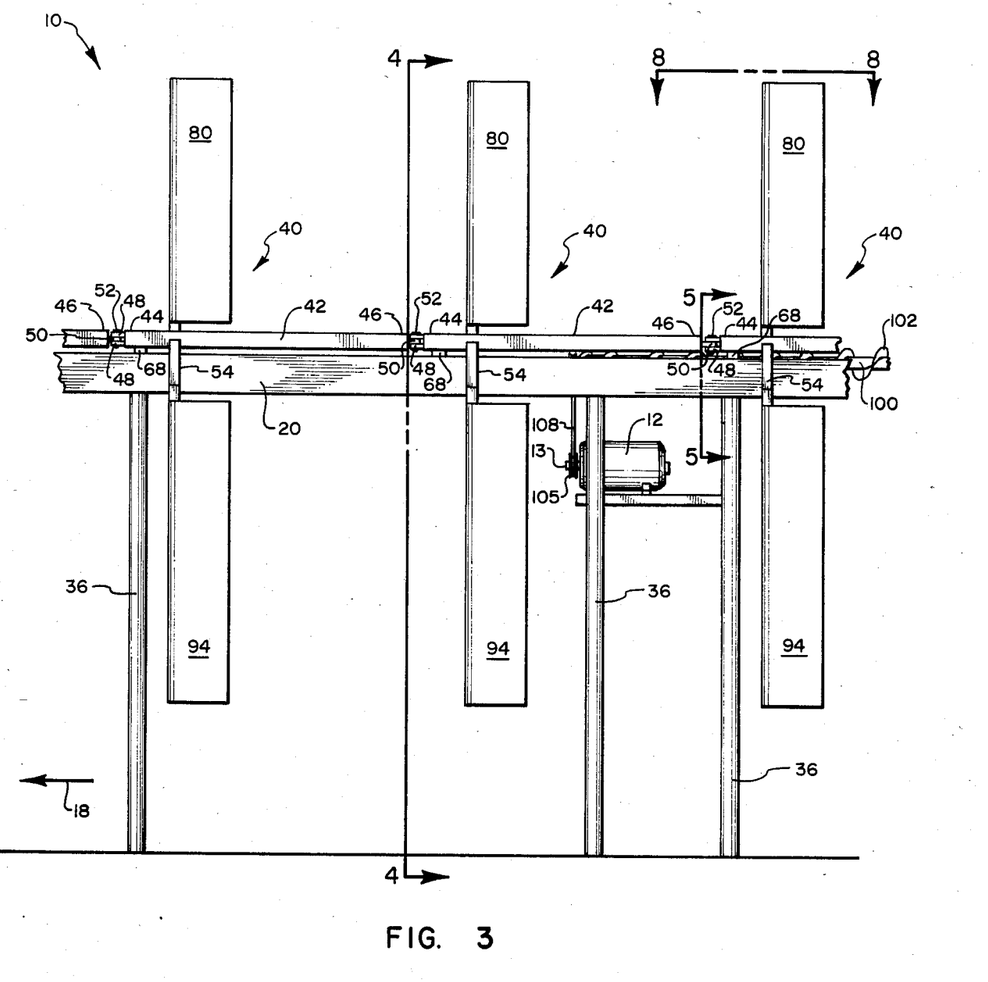
FIG. 3 is a side elevation view taken along the line 3—3 of FIG. 1.
Figures 4, 5, 6:
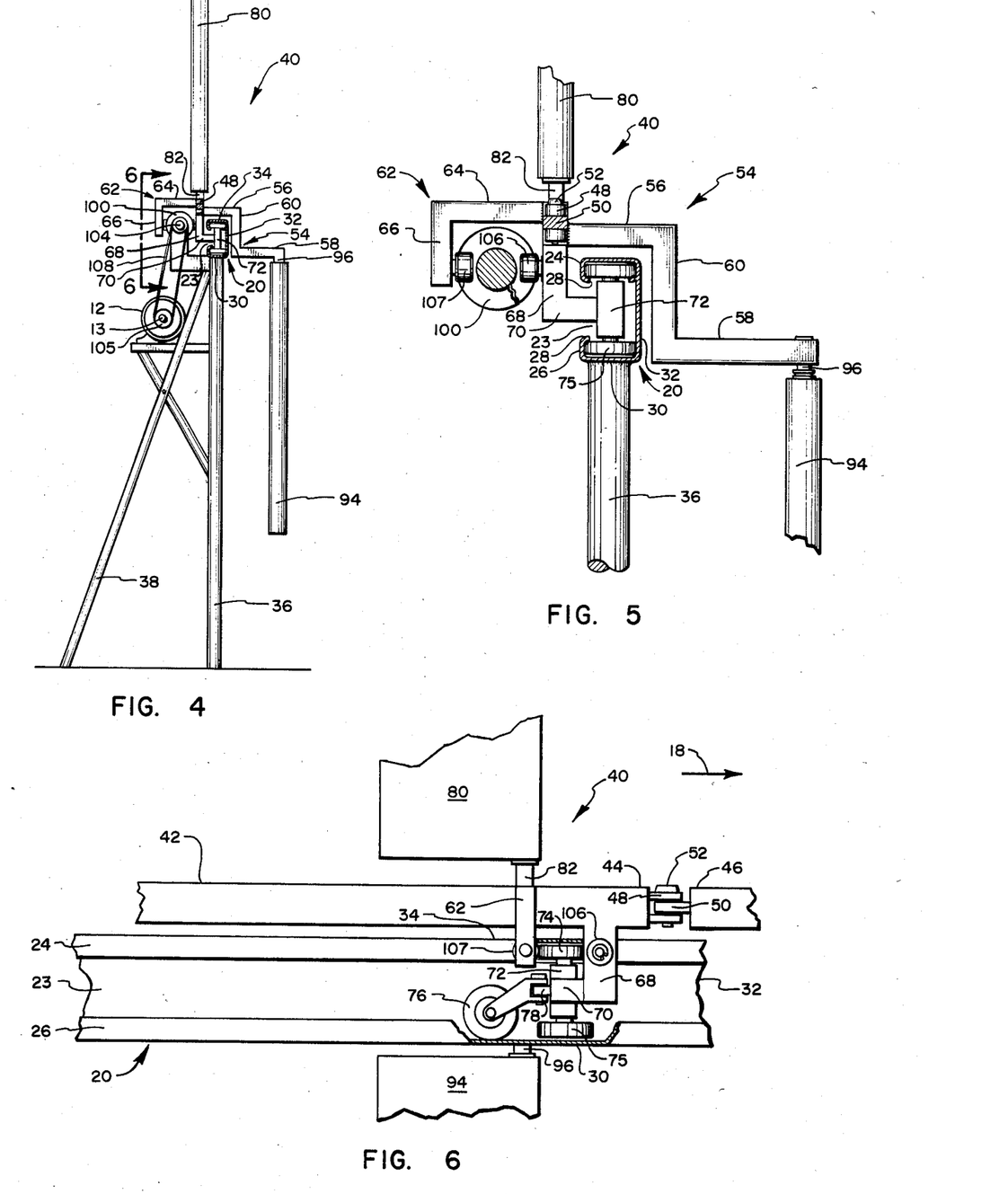
FIG. 4 is an end cross-section view taken along the line 4—4 of FIG. 3.
FIG. 5 is an enlarged view of a portion of FIG. 3 with part of the auger broken away to show the position of the auger drive rollers.
FIG. 6 is a side elevation view taken along lines 6—6 of FIG. 4 with portions broken away to more particularly illustrate the sail-car suspension assembly.

One preferred embodiment of sail-cars 40 is illustrated in FIGS. 3–8. With particular reference to FIG. 3, it can be seen that each sail-car includes a horizontal beam 42 constructed to facilitate the joining of adjacent sail-cars so as to form one continuous chain. For example, as shown in FIGS. 3 and 6, the forward end 44 of horizontal beam 42 is advantageously provided with a coupling bracket 48, and the rearward end 46 of the horizontal beam is provided with a corresponding coupling tab 50. Holes may then be formed through both coupling bracket 48 and coupling tab 50 such that a coupling pin 52 may be inserted through the holes, thereby joining the two horizontal beams 42 together in a tail-to-nose configuration.

While each sail-car must be of sturdy construction so as to maintain its structural integrity while being subjected to various stresses during operation, it will be appreciated that the sail-cars should also be constructed so as to be as light as possible so that as little current force as possible will be required in order to cause them to be conveyed around the monorail.

Thus, each horizontal beam 42 of the illustrated embodiment has three rigid structures extending therefrom: a vertical frame support 68, an inside frame extension 54, and an outside frame extension 62. These three structures, together with horizontal beam 42, form the sail-car frame.

As shown best in FIGS. 4 and 5, vertical frame support 68 extends from the underside of horizontal beam 42 at a position near the forward end thereof. An inside auger drive roller 106 is attached to vertical frame support 68 so as to extend outward from the monorail loop (see FIG. 1), at a distance and height such that the roller is capable of properly engaging the inner side of the augers when sail-car 40 is suspended from monorail 20.

Inside frame extension 54 extends inwardly from horizontal beam 42 toward the interior of the monorail loop (see FIG. 1). As shown in FIGS. 4 and 5, the inside frame extension comprises a pair of horizontal arms 56 and 58 connected by a vertical arm 60. Advantageously, horizontal arm 56 is slightly longer than the width of the monorail; horizontal arm 58 is slightly longer than the width of the downward sail 94 so as to permit downward sail 94 to rotate about downward sail support pole 96 without colliding with monorail support posts 36; and vertical arm 60 is approximately as long as the height of monorail 20.

Thus, horizontal arms 56 and 58 are each connected at one end to opposite ends of vertical arm 60 such that the inside frame extension formed thereby, lies substantially in one vertical plane. The other end of horizontal arm 56 is attached to the inward side of horizontal beam 42 at a point slightly rearward of the point at which vertical frame support 68 is attached (see FIG. 3). With inside frame extension 54 thus attached, and with sail-car 40 properly suspended from monorail 20, there is a relatively small space between inside frame support 54 and monorail 20 and between vertical frame support 68 and monorail 20. As pointed out more fully below, minimizing this space helps prevent sail-car derailment.

Outside frame extension 62 extends from the outward side of horizontal beam 42 away from the exterior of the monorail loop (see FIG. 1). As illustrated in FIGS. 4 and 5, outside frame extension 62 is comprised of horizontal arm 64 and vertical arm 66. One end of horizontal arm 64 is connected to one end of vertical arm 66 such that the vertical arm extends downwardly from the horizontal arm. The other end of horizontal arm 64 is perpendicularly attached to the outward side of horizontal beam 42 such that the outside frame extension and the inside frame extension lie substantially in one vertical plane (see FIGS. 7 and 8).

An outside auger drive roller 107 is attached to the inward side of vertical arm 66, and the lengths of horizontal arm 64 and vertical arm 66 are such that the outside auger drive roller will properly engage the outer side of augers 100 when sail-car 40 is suspended from monorail 20. Importantly, inside auger drive roller 106 and outside auger drive roller 107 lie substantially in the same horizontal plane and simultaneously engage opposite sides of augers 100 so as to minimize the lateral stress upon the augers and their bearings.

One manner in which sail-cars 40 may be suspended from monorail 20 is illustrated in FIGS. 4-7. As shown best in FIG. 5, suspension arm 70 extends horizontally from the lower end of vertical frame support 68. When sail-car 40 is properly positioned over monorail 20, suspension arm 70 passes through channel 23 into the interior or monorail 20.

A vertical axle assembly 72 is connected to the end of suspension arm 70 situated within monorail 20. Two horizontal guide wheels 74 and 75 are mounted on the vertical axle assembly so as to be adjacent and substantially parallel to top wall 34 and bottom wall 30 of monorail 20, respectively. The diameter of horizontal guide wheels 74 and 75 is slightly less than the width of monorail 20, such that horizontal guide wheels 74 and 75 are free to rotate within monorail 20.

Swivel member 78 is attached to the rearward side of vertical axle assembly 72. A vertical carrier wheel 76 is connected to swivel member 78 so that the vertical carrier wheel may swivel about a vertical axis passing through swivel member 78.

As sail-car 40 travels along monorail 20, vertical carrier wheel 76 rolls along bottom wall 30 of monorail 20, supporting substantially the entire weight of sail-car 40. Horizontal guide wheels 74 and 75, simultaneously roll along the side walls of the monorail and stabilize sail-car 40, making sail-car derailment virtually impossible. Optional free edge or lip 29 on the interior surface side wall 32 of the monorail further supports wheel 74 and gives even greater protection from possible derailment.

Figure 7:
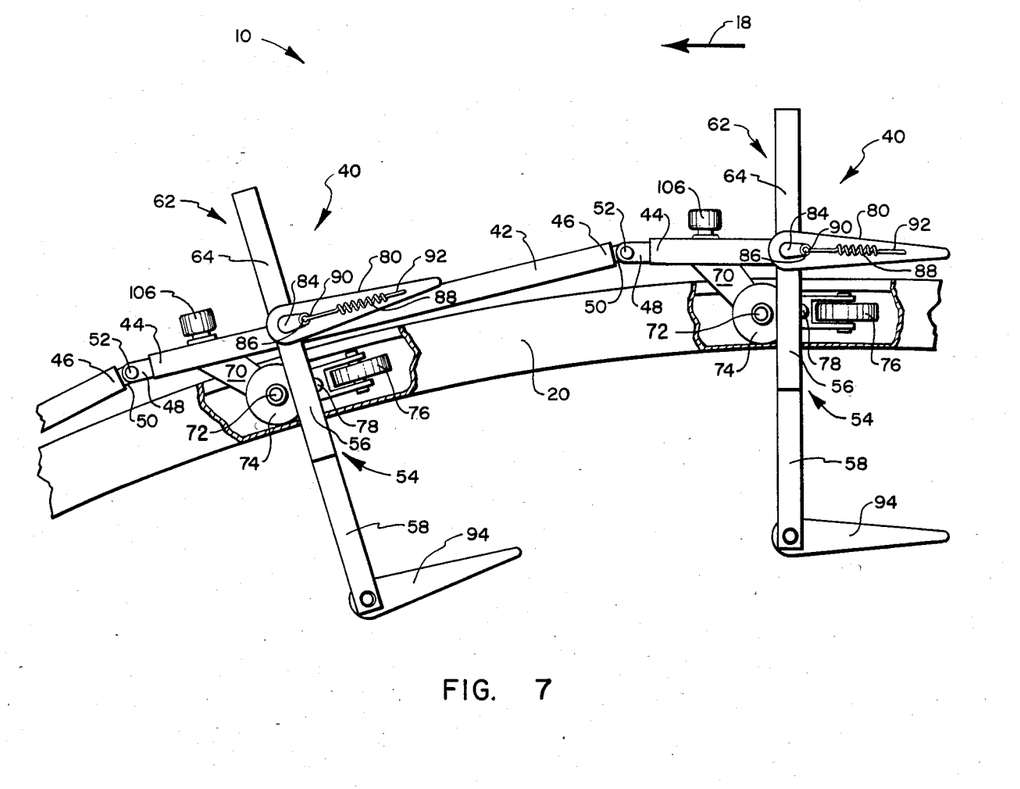
FIG. 7 is a top elevation view of two sail-cars at a location on one of the curved end sections of the monorail, with portions of the monorail broken away to reveal the orientation of the suspension wheels.

As best seen in FIG. 7, suspension arm 70 advantageously serves as a common support for the carrier and guide wheels. When viewed from above, the suspension arm advantageously forms an acute angle with the rearward portion of horizontal beam 42, so that when the sail-car travels around one of the semicircular end track segments of the monorail, the suspension arm will rotate slightly about vertical axis assembly 72 so as to form an angle with monorail 20 which is more nearly prpendicular, as illustrated in FIG. 7. Even though vertical axle assembly 72 is thus rotated, however, swivel member 78 allows vertical carrier wheel 76 to continuously align itself with the direction of travel. Further, because of the configuration of suspension arm 70, this slight rotation provides additional clearance between vertical frame support 68 and the monorail, and between vertical arm 60 and the monorail while the sail-car travels along the curved end track segment. This additional clearance is necessary when there is only a small clearance between the sail-car and the monorail. As previously mentioned, it is desirable to maintain a small clearance between the monorail and the sail-car because this minimizes the possibility of sail-car derailment. For example, if wheels 74, 75, or 76 should fail (as is possible if inflatable tires are used), the sail-car will come to rest on the monorail rather than being derailed. Similarly, use of a narrow clearance between the sail-car and monorail also reduces the likelihood of damage in the event of other failures of the sail-car suspension system.

Each sail-car is preferably provided with a pair of sails 80 and 94. As illustrated in FIGS. 3 and 4, sail 80 extends vertically upward from sail-car 40 and sail 94, vertically downward.

In order to minimize the structural stress and wear on the sail-car, and to provide for a smoother sail-car ride, it is desirable to construct sails 80 and 94 such that the average, total current force on each sail is approximately the same. Accordingly, sails 80 and 94 may have unequal surface areas to account for differing current velocities at different altitudes. For example, it has been observed that wind velocities are often greater at higher altitudes. In such a case, therefore, it would be desirable to provide downward sail 94 with a slightly larger surface area than upward sail 80.

For the same reasons, it is also advantageous to construct sail-car 40 such that the sail-car's center of gravity is located at the point where vertical carrier wheel 76 contacts bottom wall 30 of the monorail. Thus, sails 80 and 94 should be attached so as to balance the sail-car on vertical carrier wheel 76.

Sails 80 and 94 are advantageously mounted on support poles 82 and 96, respectively. Upward sail support pole 82 is rigidly attached to the top of horizontal beam 42 so as to extend vertically upward from the horizontal beam and lie substantially in the same vertical plane as inside frame extension 54 and outside frame extension 62 (see FIGS. 7 and 8). Downward sail support pole 96, on the other hand, extends vertically downward from the inward end of inside frame extension 54.

Figure 8:
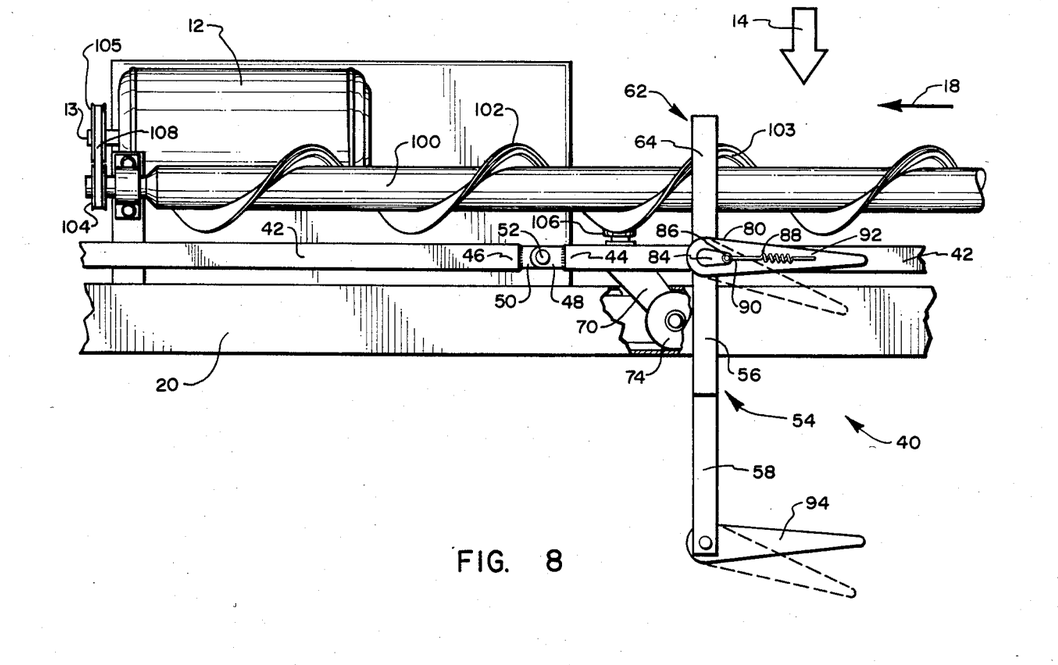
FIG. 8 is a top elevation view taken along the line 8—8 of FIG. 3 with portions of the monorail broken away to show the suspension wheels.

With particular reference now to FIG. 8, sails 80 and 94 have a generally wedge-shaped horizontal cross section, and support poles 82 and 96 extend through the thicker portion of sails 80 and 94, respectively. Importantly, sails 80 and 94 are capable of rotating 360 degrees about support poles 82 and 96. This result may be achieved, for example, by forming a vertical, cylindrical sleeve through the thicker portion of sails 80 and 94 and inserting support poles 82 and 96 into such sleeves. Of course, downward sail 94 must also be secured on support pole 96 by some suitable means, such as by an enlarged collar member (not shown) around the downward end of support pole 96.

Despite the rotational capability of sails 80 and 94, however, sails 80 and 94 are biased to a preferred orientation, which in the illustrated embodiment is a direction opposite the direction of travel. Nevertheless, sails 80 and 94 may be temporarily deflected into other orientations under the influence of wind or water currents.

The presently preferred means for biasing sails 80 and 94 is illustrated in FIG. 8, and will be described with particular reference to upward sail 80. The preferred biasing means comprises a rigid biasing arm 84 and a tension spring 88. As shown in FIG. 8, the rigid biasing arm extends horizontally from the upward end of upward sail support pole 82 in a direction opposite the direction of travel. One end 90 of the tension spring is then connected to the end of rigid biasing arm 84 so as to be capable of rotating freely about a vertical axis passing through the connection point. One preferred means for connecting end 90 of tension spring 88 is to provide an upward vertical post 86 on the end of rigid biasing arm 84. When this approach is taken, end 90 of tension spring 88 is advantageously formed into a corresponding circular loop which may be placed over and secured upon the upward vertical post.

End 92 of tension spring 88 is similarly connected near the narrow edge of upward sail 80. Importantly, the tension spring is connected to the sail such that there is always some degree of tension in the tension spring. Advantageously, the tension in tension spring 88 may also be variable.

The preferred means for biasing downward sail 94 is virtually identical to that just described with respect to upward sail 80. The only difference between the preferred means for biasing the two sails is that rigid biasing arm 84 and tension spring 88 are connected to the downward ends, rather than the upward ends, of downward sail support pole 96 and downward sail 94, respectively.

With sails 80 and 94 being constructed and biased as described above, tension springs 88 have a tendency to force sails 80 and 94 to assume the preferred orientation. When a current passes sails 80 and 94 in the direction of arrow 14, the sails are deflected, as shown by dashed lines in FIG. 7. With sails 80 and 94 so deflected, the force of tension springs 88 and of current 14 propels the sail-car along the monorail in the direction of arrow 18.

Because of the unique construction of the sails and biasing tension spring, the sail-cars will be propelled in the direction of arrow 18 regardless of the current direction, although the optimum movement is realized when the current approaches the monorail perpendicular to the linear parallel side track segments 21. Further, adjustments to variations in the current direction are made automatically with no need to mechanically adjust the orientation of the sails.

In the event the current becomes destructively strong, it will overcome the bias applied by tension springs 88, thus causing the sails to rotate about the support poles so as to align themselves with the current, thereby affording minimum resistance to the current. When the current strength once more decreases to an acceptable level, tension springs 88 again force the sails to return to a position suitable for propelling the sail-cars. The tension in tension springs 88 should, therefore, be selected both to allow sails 80 and 94 to align themselves quickly with destructively strong currents, thus minimizing the possibility of damage, and also to provide the appropriate thrust to the sail-cars under normal conditions.

Figure 9:
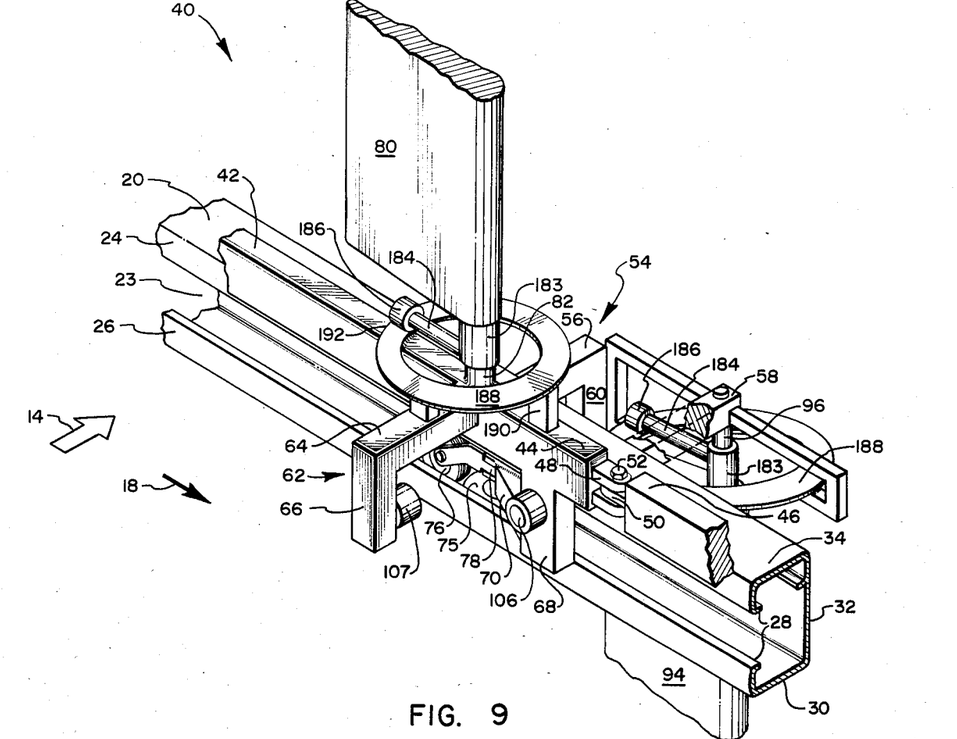
FIG. 9 is a side elevation view of a portion of a sail-car showing an alternate means for biasing the sail structures to a preferred orientation.

An alternate means for biasing sails 80 and 94 is illustrated in FIG. 9. Using this alternate biasing means, sails 80 and 94 are mounted on support poles 82 and 96, respectively so as to be capable of rotating 360 degrees about support poles 82 and 96, and simultaneously of being vertically lifted along support poles 82 and 96. With the sails thus mounted, sails 80 and 94 may be biased to a preferred orientation by the force of their own weight. As with the presently preferred biasing means, this alternate biasing means will first be described with particular reference to upward sail 80.

As illustrated in FIG. 9, upward sail 80 may be biased by attaching an inclined, slightly elliptical ring 188 to sail-car 40 adjacent to the downward end of sail 80 such that, when viewed from above, ring 188 appears to be a circle which is concentric with support pole 82. Importantly, the lowest point along inclined ring 188 is rearward of support pole 82.

Inclined elliptical ring 188 may be attached to sail-car 40 by any suitable means. For example, it is shown in FIG. 9 as being attached to horizontal beam 42 of sail-car 40 by means of long vertical support 190 and short vertical support 192. As illustrated, long vertical support 190 and short vertical support 192 are each attached at one end to the underside of inclined elliptical ring 188. Supports 190 and 192 are attached at the other end to horizontal beam 42 so as to lie forward and rearward of support pole 82, respectively.

A rigid arm 184 aligned with sail 80 is advantageously secured to a rigid sleeve 183 extending from the lower end of the sail and surrounding support pole 82.

A wheel 186 is provided on the end of rigid arm 184 so as to facilitate rolling along inclined elliptical ring 188. Importantly, elliptical ring 188, rigid arm 184, and wheel 186 are all attached such that wheel 186 is constantly in contact with inclined elliptical ring 188 and continually carries the weight of the sail.

Downward sail 94 may be biased in a similar manner. However, as depicted in FIG. 9, elliptical ring 188, rigid sleeve 183, rigid arm 184, and wheel 186 are all preferably located adjacent to the upward end, rather than the downward end, of sail 94. Additionally, vertical supports 190 and 192 are attached to elliptical ring 188 so as to provide sufficient clearance for wheel 186, as illustrated.

With this construction, sails 80 and 94 tend to orient themselves such that wheels 186 are at the lowest point along elliptical rings 188. Thus, when this lowest point is rearward of the support poles, the sails will again tend to be oriented parallel to the horizontal beam.

When a current acts upon sails 80 and 94 in the direction of arrow 14, the sails will rotate and also be lifted slightly as wheels 186 roll along inclined elliptical rings 188. The weight of sails 80 and 94 resisting the force of current 14 will then cause the sail-car to be propelled along monorail 20 in the direction of arrow 18.

In the event that the current force applied to sails 80 and 94 becomes too strong, the sails are again free to align themselves with the current. Then, when the current force decreases, sails 80 and 94 will once more orient themselves so as to propel the sail-car.

The force which is necessary to rotate and lift the sails may be predetermined by choosing the incline of the elliptical ring. Advantageously, a short vertical support 192 may be provided with a swivel attachment (not shown) at the point where it is connected to the inclined elliptical ring, and the long vertical support 190 may be variable in length, thereby making the incline of elliptical ring 188 adjustable.

A variation of this approach would be to bias the sails by mounting the inclined elliptical ring on a compressible spring (not shown). For example, a spring may be substituted for the long vertical support 190 such that the spring is compressed as wheel 186 travels along the inclined elliptical ring. The tension of the spring would then determine the force necessary to rotate the sail and the sail would not itself have to be lifted.

As explained previously, the translational motion of the chain of sail-cars is converted to rotational motion by engagement with an auger 100. The specific construction of one preferred embodiment of the auger is best shown in FIG. 8, where it is seen that the auger is preferably an elongated, cylindrical member having a continuous spiral fin 102 attached thereto. In order to provide for the smooth, continuous rotation of the auger 100, it is presently preferred that the auger be long enough to be engaged by at least two sail-cars simultaneously.

As previously mentioned, auger 100 is positioned adjacent and substantially parallel to the monorail. Specifically, auger 100 is positioned so that outside frame extensions 62 of adjacent sail-cars pass above auger 100, with corresponding auger drive rollers 106 and 107 simultaneously engaging spiral fin 102 at opposite sides of the auger (see FIGS. 4, 5, and 8). The use of two auger drive rollers 106 and 107, which simultaneously engage spiral fin 102 as indicated above, minimizes the stress on the auger and the possibility that the auger will be bent.

The rotational motion of the auger may then be used to run an electric generator 12. By way of illustration, such a generator may advantageously be mounted on a horizontal platform located adjacent to the auger, as shown in FIGS. 3 and 4. Pulley wheels 104 and 105 may then be attached to one end of auger 100 and to shaft 13 of the electric generator, respectively, such that pulley wheels 104 and 105 are vertically aligned, as shown. Drive belt 108 may therein be placed snugly around the pulley wheels such that any rotation of auger 100 will drive the electric generator. Alternatively, a transmission may be incorporated between the auger and generator if deemed advisable.

As illustrated in FIG. 1, the generating capacity of generator apparatus 10 may be increased by positioning additional augers 100 and electric generators 12 at various locations along monorail 20 in the manner described above. Alternatively, such generating capacity could also be increased by connecting several augers 100 to one, centrally located electric generator (not shown) by means of belts or shafts.

In addition to the basic requirements set forth above, the augers could advantageously include other features and details which would further contribute to smooth, continuous rotation. For example, the end sections of spiral fins 102 could be flared to provide for smooth engagement of auger 100 by auger drive rollers 106 and 107. Further, such flared sections could be lined with leather, or some suitable material, to provide additional smoothness and continuity. Additionally, a fly wheel could be connected to each auger 100 to help govern the rotation of augers 100. Augers 100 could also be equipped with a braking system to assist in system shut down.

As best seen in FIG. 8, it would also be advantageous to provide a raised lip 103 on the side of spiral fin 102 that comes in contact with drive rollers 106 and 107, so that only a narrow portion of the auger comes in contact with drive rollers 106, 107, thus minimizing torsional stresses which may occur when substantially cylindrical drive rollers are used. Alternatively, such stresses may be relieved by utilizing tapered drive rollers.

Figure 10:
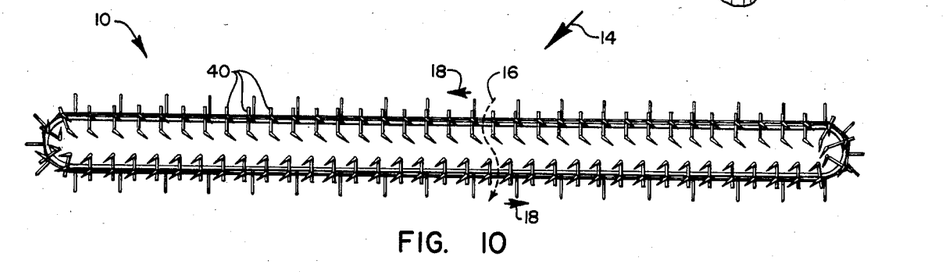
FIG. 10 is a plan view illustrating one presently preferred configuration for a single monorail which uses deflected currents to increase generating efficiency.
Figure 11:
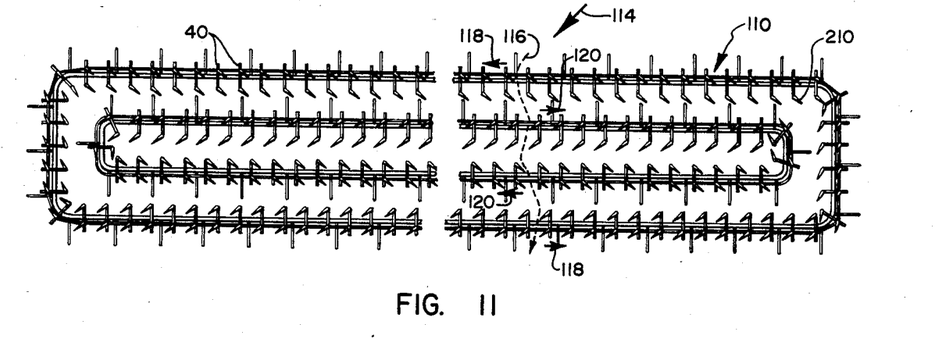
FIG. 11 is a plan view of one presently preferred configuration incorporating two concentric monorails which use deflected currents to increase generating efficiency.

The efficiency of the wind and water powered apparatus of the invention can be further improved by careful attention to the monorail loop configurations. FIGS. 10 and 11 illustrate two possible monorail loop configurations which maximize the efficient use of natural air or water currents. In FIG. 10, a single monorail loop is shown wherein the side track segments 21 of monorail 20 are situated very close together, although not close enough to permit a collision between downward sails 94 of the several sail-cars 40. With such a monorail loop configuration, both incident and deflected currents will assist in sail-car propulsion. Thus, as illustrated in FIG. 10, when a current passes the first row of sail-cars in the direction of arrow 14, the current is deflected as shown by dotted lines 16. The deflected current 16 is then more optimally directed to forcefully propel the second row of sail-cars along the monorail.

Similarly, the monorail configuration illustrated in FIG. 11 uses both incident and deflected currents to optimize motion of the sail-cars around the monorail. This configuration comprises two separate, concentric monorail loops 110 and 210. As shown in FIG. 11, a chain of sail-cars are positioned on outer monorail loop 110 so as to travel in the direction of arrow 118. Concurrently, another chain of sail-cars are positioned on inner monorail loop 210 so as to travel in the opposite direction, the direction of arrow 120. Importantly, the distance between monorail loops 110 and 210 is as small as possible while avoiding a collision between the several sail structures.

When a current approaches the two monorail loops in the direction indicated by arrow 114, it is deflected by the first row of sail-cars 40, as shown by arrow 116. The deflected current 116 is then better directed to forcefully propel the second row of sail-cars 40 along monorail 210. Once again, the current will be deflected, this time back toward its original direction. Thus, when the current reaches the third row of sail-cars 40, it is again moving substantially in the direction of arrow 114. As before, the current is deflected as shown by dotted lines 116, and thus forcefully propels the third and fourth row of sail-cars 40 in the direction of arrows 120 and 118, respectively. By thus making use of both incident and deflected currents, the efficiency of the generating systems shown in FIGS. 10 and 11 is increased.

The apparatus of the present invention could be constructed virtually in any size so as to achieve the desired generating capacity. To achieve a relatively large capacity, for example, the monorail loop could be 60 feet wide and 520 feet long, with monorail 20 being 18 inches by 30 inches in cross-section. A suitable length for sail-cars 40 could then be 20 feet. Further, support posts 36 could be 30 feet long, and sails 80 and 94 could have lengths of 16 feet and 20 feet, respectively.

From the above discussion, it will be appreciated that the present invention provides a strong, stable wind or water powered device which can efficiently generate significant quantities of electricity from natural air or water currents. Also, the novel sail construction and biasing means of the present invention allows the individual sails to quickly and automatically align themselves with normal currents for maximum generating efficiency, and also to rapidly orient themselves for minimum resistance when destructively forceful currents arise. Further, because of the monorail construction and, particularly due to the two horizontal guide wheels, the likelihood of sail derailment and destruction in the present invention is minimal. This invention has further provided a large capacity wind or water powered electric generating device which uses a stationary, central electric generator, and a light and relatively inexpensive means for driving the generator.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A monorail conveyance system for use in generating electrical power from air or water currents, comprising:
   (a) a single hollow rail having a substantially rectangular cross-section with opposed pairs of vertical and horizontal sides, one of said sides being formed along a central portion thereof into a continuous longitudinal channel, said channel affording access to the interior of said rail;
   (b) a conveyance driven by said currents along said rail; and
   (c) a suspension system for supporting said conveyance in its movement along said rail, said suspension system comprising:
      (i) a first wheel for bearing the weight of said conveyance, said first wheel being located within the interior of said rail and being oriented to rotate in a vertical plane, and
      (ii) second and third wheels located within the interior of said rail and oriented to rotate in separate horizontal planes, the diameter of said second and third wheels being slightly less than the separation between the interior surfaces of said opposed vertical sides of said rail, thereby to insure the stability of said conveyance upon said rail.

2. A monorail conveyance system as defined in claim 1 wherein said first wheel is situated at substantially the center of gravity of said conveyance.

3. A monorail conveyance system as defined in claim 1 wherein the smaller sides of said substantially rectangular rail are said horizontal sides thereof, and said channel is formed in one of said vertical sides thereof.

4. A monorail conveyance system as defined in claim 3, wherein said second and third wheels are aligned vertically with respect to one another.

5. A monorail conveyance system as defined in claim 1, wherein said suspension system further comprises a suspension arm extending into the interior of said rail through said channel and having inner and outer end portions, said outer end portion supporting said conveyance and said inner end portion connected to said first, second, and third wheels.

6. A monorail conveyance system as defined in claim 5 wherein said first wheel is secured by means of a swivel connection to said support arm, so that said first wheel may remain aligned with said rail as said conveyance passes around curved sections thereof.

7. A monorail conveyance system as defined in claim 5 wherein said suspension arm is oriented at an acute angle to the rear of said conveyance so that the clearance between said rail and portions of said conveyance opposite said rail in the plane of curved sections thereof increases as the conveyance passes around said curved sections.

8. A monorail conveyance system as recited in claim 1, wherein said suspension system consists of said first, second, and third wheels.

9. A monorail conveyance system as recited in claim 1 in which the free edges of said channel turn inwardly of said hollow rail to more securely retain said second and third wheels within said rail.

10. A monorail conveyance system as recited in claim 9, further comprising at least one continuous elongated lip opposing one of said edges of said channel and formed on the interior surface of the side of said rail opposite therefrom.

* * * * *